(12) United States Patent
Schmidt

(10) Patent No.: US 8,844,403 B2
(45) Date of Patent: Sep. 30, 2014

(54) SHAFT-HUB CONNECTION

(75) Inventor: Hans Bernd Schmidt, Nürnberg (DE)

(73) Assignee: Audi AG, Ingolstadt (DE)

( * ) Notice: Subject to any disclaimer, the term of this patent is extended or adjusted under 35 U.S.C. 154(b) by 10 days.

(21) Appl. No.: 13/259,637

(22) PCT Filed: Mar. 20, 2010

(86) PCT No.: PCT/EP2010/001761
§ 371 (c)(1),
(2), (4) Date: Sep. 23, 2011

(87) PCT Pub. No.: WO2010/108636
PCT Pub. Date: Sep. 30, 2010

(65) Prior Publication Data
US 2012/0017721 A1  Jan. 26, 2012

(30) Foreign Application Priority Data
Mar. 25, 2009 (DE) .......................... 10 2009 014 895

(51) Int. Cl.
| | |
|---|---|
| *F16H 53/02* | (2006.01) |
| *F16B 17/00* | (2006.01) |
| *F16B 4/00* | (2006.01) |
| *F16H 53/00* | (2006.01) |
| *F01L 1/04* | (2006.01) |

(52) U.S. Cl.
CPC .............. *F01L 1/04* (2013.01); *F01L 2820/01* (2013.01); *F16H 53/025* (2013.01)
USPC .......................................... 74/567; 403/273

(58) Field of Classification Search
USPC ............. 74/567–569; 29/447, 888.1; 403/273
See application file for complete search history.

(56) References Cited

U.S. PATENT DOCUMENTS

| | | | |
|---|---|---|---|
| 3,734,697 A | 5/1973 | Sieghartner | |
| 4,382,390 A * | 5/1983 | Jordan | ............................. 74/567 |

(Continued)

FOREIGN PATENT DOCUMENTS

| | | |
|---|---|---|
| DE | 23 33 040 | 1/1975 |
| DE | 37 32 223 A1 | 4/1988 |

(Continued)

OTHER PUBLICATIONS

Translation of DE 102004002301, obtained May 28, 2014.*

*Primary Examiner* — James Pilkington
*Assistant Examiner* — Brian McGovern
(74) *Attorney, Agent, or Firm* — Henry M. Feiereisen LLC

(57) ABSTRACT

The invention relates to a shaft-hub connection, in particular of assembled camshafts (10) for combustion engines, at which at least two functional parts (14, 16, 18) are shrunk or pressed onto corresponding rotationally symmetric shaft sections (24, 26, 28) with the hub thereof, wherein in an assembly direction (30) of the functional parts (14, 16, 18), the first section (24) is designed with a larger exterior circumference than the second section (26). According to the invention, the exterior circumference of the first shaft section (24) has a configuration, which varies between two base circles ($d_{Imin}$) and ($d_{If}$), over which first shaft section (24) the second functional part (16) with a corresponding interior circumference can be slid, which varies between two base circles ($D_{IIf}$) and ($D_{IImax}$), wherein in the assembly state the smaller base circle ($D_{IIf}$) and the larger base circle ($D_{IImax}$) of the second functional part (16) have a larger dimension than the corresponding base circles ($d_{If}$) and ($d_{Imin}$) of the first shaft section (24).

4 Claims, 2 Drawing Sheets

(56) References Cited

U.S. PATENT DOCUMENTS

| | | | |
|---|---|---|---|
| 4,630,498 A | 12/1986 | Santi | |
| 4,882,825 A * | 11/1989 | Nakamura | 29/888.1 |
| 4,886,392 A | 12/1989 | Iio | |
| 4,922,785 A * | 5/1990 | Arnold et al. | 74/567 |
| 5,253,546 A * | 10/1993 | Elrod et al. | 74/567 |
| 5,272,930 A | 12/1993 | Nakamura et al. | |
| 5,299,881 A | 4/1994 | Mettler-Friedli | |
| 5,307,708 A | 5/1994 | Matt | |
| 5,570,507 A * | 11/1996 | Hochstein | 29/888.1 |
| 5,738,052 A * | 4/1998 | Meurer et al. | 123/90.6 |
| 6,167,856 B1 * | 1/2001 | Rao et al. | 123/90.51 |
| 6,416,245 B1 | 7/2002 | Matt | |
| 6,904,882 B2 * | 6/2005 | Battlogg | 123/90.26 |
| 8,342,146 B2 * | 1/2013 | Schuler et al. | 123/90.6 |
| 2004/0000213 A1 * | 1/2004 | Hamamoto et al. | 74/567 |
| 2005/0172755 A1 * | 8/2005 | Burgler | 74/567 |
| 2006/0005385 A1 * | 1/2006 | Quaas | 29/888.08 |
| 2008/0250895 A1 | 10/2008 | Yamamoto et al. | |
| 2010/0224145 A1 | 9/2010 | Mueller | |

FOREIGN PATENT DOCUMENTS

| | | | |
|---|---|---|---|
| DE | 41 21 951 C1 | 12/1992 | |
| DE | 42 18 624 A1 | 12/1992 | |
| DE | 102004002301 | * 11/2005 | B23P 15/00 |
| DE | 212006000020 | 12/2007 | |
| DE | 10 2006 035 082 | 1/2008 | |
| EP | 0 282 166 A1 | 9/1988 | |
| EP | 0 745 757 A1 | 12/1996 | |
| GB | 2217422 | * 10/1989 | F16H 53/04 |
| GB | 2 290 599 A | 1/1996 | |
| GB | 2 298 909 A | 9/1996 | |
| WO | WO 2006/136252 A1 | 12/2006 | |

* cited by examiner

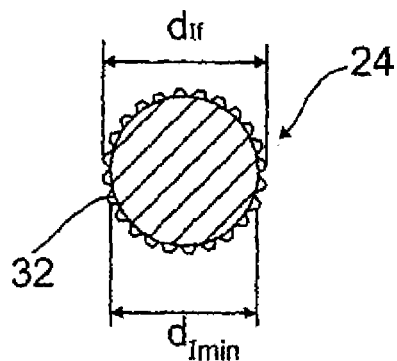
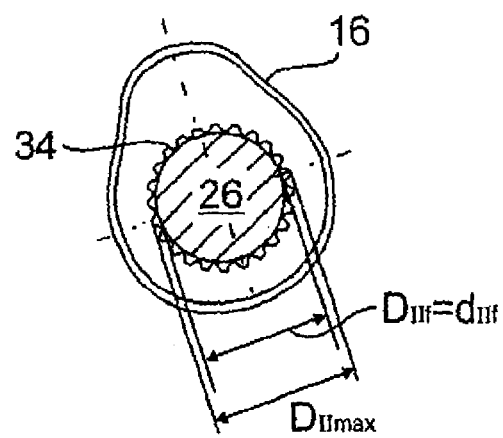
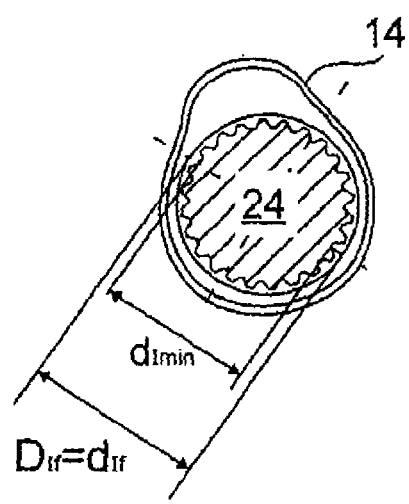

SHAFT-HUB CONNECTION

CROSS-REFERENCES TO RELATED APPLICATIONS

This application is the U.S. National Stage of International Application No. PCT/EP2010/001761, filed Mar. 20, 2010, which designated the United States and has been published as International Publication No. WO 2010/108636 A1 and which claims the priority of German Patent Application, Serial No. 10 2009 014 895.7, filed Mar. 25, 2009, pursuant to 35 U.S.C. 119(a)-(d).

BACKGROUND OF THE INVENTION

The invention relates to a shaft-hub connection, in particular for assembled camshafts for internal combustion engines.

Shaft-hub connections wherein the respective functional part is affixed on the shaft with a press fit or a shrink fit are known from several technical applications. For example, it is known to affix the individual cams of assembled camshafts for internal combustion engines on the shaft with a press fit or a shrink fit. However, this requires that the respective sections of the shaft for the cams have a stepped or at least identical exterior diameter when viewed in the assembly direction. If structural considerations require a configuration where a section of the shaft has a smaller diameter in the assembly direction than the previous section, then the corresponding functional part can no longer be pressed on or shrunk on, because the functional part cannot be pushed across the section with the larger diameter.

It is therefore an object of the invention to propose a shaft-hub connection of the generic type, wherein a functional part of a section of the shaft having a smaller diameter can nevertheless be connected by a press fit or a shrink fit with only slightly increased complexity.

SUMMARY OF THE INVENTION

This object is attained according to the invention by a shaft-hub connection, comprising: a shaft comprising a plurality of rotationally-symmetric shaft sections; and at least two functional parts having associated hubs, wherein the at least two functional parts are connected to corresponding shaft sections by a shrink fit or a press fit, and wherein a first shaft section is formed with a greater exterior diameter than a second section in an assembly direction of the at least two functional parts, wherein an exterior circumference of the first shaft section has a configuration which varies between a first and a second base circle, wherein a second of the at least two functional parts is slid onto the first shaft section with a corresponding interior circumference that varies between a smaller base circle and a larger base circle, and wherein when the at least two functional parts are connected to corresponding shaft sections, the smaller base circle and the larger base circle of the second functional part are sized to be greater than the corresponding second and first base circles of the first shaft section.

It is therefore proposed that the exterior circumference of the first section of the shaft has a configuration with two base circles $d_{Imin}$ and $d_{If}$ over which the second functional part with a corresponding interior circumference with two base circles $D_{IIf}$ and $D_{IImax}$ can be slid. In the connected state, the smaller base circle $D_{IIf}$ of the second functional part corresponds to the exterior diameter $d_{IIf}$ of the second section of the shaft, whereas the larger base circle $d_{If}$ of the first section of the shaft corresponds to the interior diameter $D_{If}$ of the first functional part. The second functional part located in the assembly direction therebehind can then be slid over the first section of the shaft during assembly and subsequently affixed on the second section of the shaft by a press fit or a shrink fit.

In a preferred embodiment of the invention, the exterior circumference of the first section of the shaft and the interior circumference of the second functional part can be constructed with axis-parallel grooves and ribs. The second functional part can then be slid over the first section of the shaft, wherein the ribs of the second functional part engage in the grooves of the section of the shaft, or vice versa.

In an alternative embodiment, the exterior circumference of the first section of the shaft and the interior circumference of the second functional part can be provided with a spline, wherein the number of teeth, the shape of the teeth, etc., may be suitably adapted to the specific requirements of the connection.

To ensure an uncomplicated assembly of the functional part, it is proposed to construct the greater base circle $D_{IImax}$ of the second functional part and its smaller base circle $D_{IIf}$ with play relative to the corresponding base circles of the first shaft section. In this way, the second functional part can be slid over the first shaft section without applying a force.

In addition, for easy and cost-effective assembly, the exterior circumference of the second section of the shaft and the interior circumference of the first functional part can be constructed as smooth cylinders.

The carrying portion (in percent) between the respective partners of the connection section of the shaft: functional part is in a range from 80:20 to 20:80, in particular at 50:50.

Lastly, in an assembled camshaft for internal combustion engines, at least one functional part may be a cam which is shrunk or pressed onto the shaft in the assembly direction subsequent to another cam or another functional part.

BRIEF DESCRIPTION OF THE DRAWING

An exemplary embodiment of the invention will be described in more detail below with reference to the appended drawing, which shows in:

FIG. 2 a cross-section taken along the line II-II of FIG. 1 through a first section of the shaft which carries a first cam as a functional part;

FIG. 3 another cross-section taken along the line III-III of FIG. 1 through a second section of the shaft which receives a second cam; and FIG. 4 a cross-section taken along the line IV-IV of FIG. 1 through the first section of the shaft and the corresponding first cam.

DETAILED DESCRIPTION OF PREFERRED EMBODIMENTS

Figure 1:
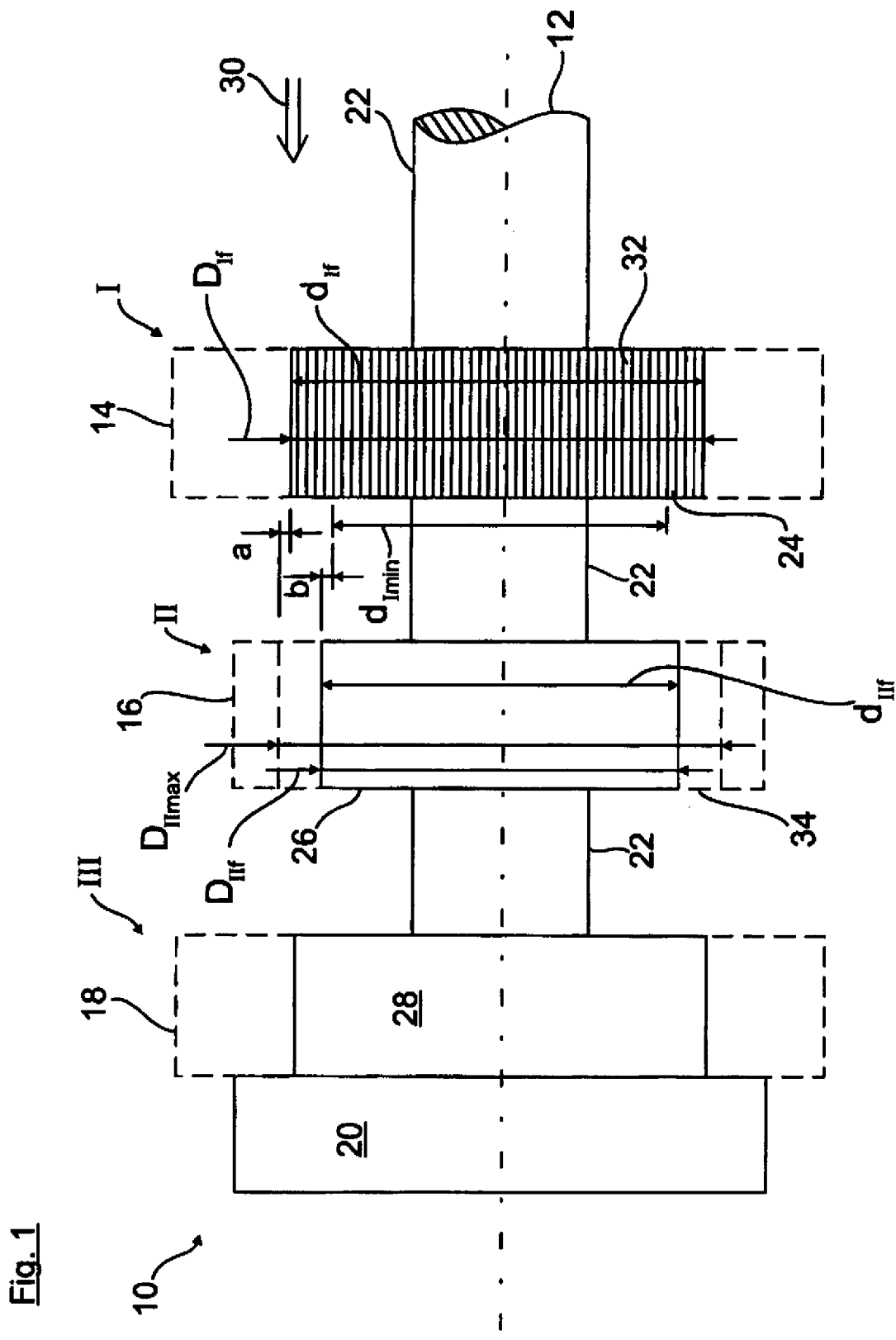
FIG. 1 a partially illustrated assembled camshaft for an internal combustion engine, wherein several cams are shrunk on sections of the shaft.

FIGS. 1 to 4 show partially a camshaft 10 for internal combustion engines, with a shaft 12 on which several cams 14, 16, 18 (indicated in FIG. 1 by a dashed line) are arranged.

The shaft 12 has sections 20, 22 which form connecting sections or rotationally-symmetric bearing sections. Rotationally symmetric sections 24, 26, 28 of the shaft 12 which carry the aforementioned cams 14, 16, 18 are directly adjacent to the sections 20, 22. In FIG. 1, the cam 14 is seated in a first connection I on the shaft section 24 with an interference press fit. Likewise, the cams 16, 18 are seated on associated shaft sections 26, 28 in a second and third connection II, III.

Due to the structure of the shaft 12, the bearing section 20 has the greatest exterior diameter, so that the cams 14, 16, 18 cannot be slid onto the shaft 12 from this side.

Moreover, the exterior diameters of the sections 24, 26 carrying the cams 14, 16 are constructed such that the exterior diameter $d_{IIf}$ of the center shaft section 26 is smaller than the exterior diameter $d_{If}$ of the first shaft section 24.

The cams 14, 16, 18 are connected to the shaft 12 and its supporting sections 24, 26, 28 from the side of the shaft 12 facing away from the bearing section 20. This is performed with a press fit or a shrink fit, wherein the exterior diameters $d_{If}$ and $d_{IIf}$ of the sections 24, 26, 28 are manufactured in a conventional manner with an oversize relative to the bores of the hubs of the cams 14, 16, 18 and are either pressed on or heat-shrunk.

For installing the cams 16 of the center section 26 with the aforementioned connection, the first section 24 of the shaft 12 is in the assembly direction (arrow 30) constructed with an exterior circumference that has a smaller base circle $d_{Imin}$ (see FIG. 2) and a greater base circle $d_{If}$.

The shaft section 24 is hereby provided with a spline 32, wherein the tip diameter forms the larger base circle $d_{If}$ and the root diameter forms the smaller base circle $d_{Imin}$. The base circle $d_{Imin}$ is hereby slightly smaller by a measure b than the exterior diameter $d_{IIf}$ of the section 26 of the shaft 12.

Moreover, the hub of the second cam 16, as viewed in the assembly direction 30, is constructed with a corresponding spline 34 (see FIG. 3), with the smaller base circle $D_{IIf}$ of the spline 34 being formed by the tip diameter and the larger base circle $D_{IImax}$ of the spline 34 being formed by the root diameter. The diameter of the larger base circle $D_{IImax}$ again slightly larger by a measure a than the exterior diameter $d_{If}$ of the section 24 of the shaft 12.

The exterior diameter $d_{If}$ of the first shaft section 24 and $d_{IIf}$ of the center shaft section 26 are also referred to as functional diameters, onto which the cams 14, 16 with their corresponding functional diameters $D_{If}$ and $D_{IIf}$ are slid. For sake of clarity of the Figures, the base circles of the cams 16 and of the first shaft section 24 are not drawn to scale.

The spline 32, 34 is constructed with rounded tip regions and feet root regions of the teeth. The spline is also manufactured symmetrically such that the carrying portion (in percent) between the hub of the cams 18, 16 on the sections 28, 26 is 50:50.

Instead of the spline, the section 28 may also have an exterior circumference formed of ribs and grooves, whereas the hub of the cam 16 has a mating interior circumference. However, other, for example undulated configurations of the circumference forming two base circles $d_{If}$ and $d_{Imin}$ and $D_{IImax}$ and $D_{Imax}$ may be employed.

The connecting partners of the first section 24 of the shaft 12 and of the second cam 16 are constructed as simple smooth cylinders. For example, the first section 26 is machined to size by turning or grinding, whereas the hub of the cam 28 is precision drilled or honed.

The exterior circumference of the first shaft section 24 produced with two base circles $d_{If}$, $d_{Imin}$ is formed, for example, by a rolling tool, and the exterior diameter $d_{If}$ is subsequently ground to size; the interior diameter $D_{IIf}$ of the hub of the cam 16 is precision drilled and subsequently expanded by clearing to $D_{IImax}$ or slightly larger.

To connect the two cams 14, 16 on the sections 24, 26, the exterior diameter $d_{If}$ of the section 26 is produced with the size of the interior diameter $D_{IIf}$ of the cam 16 and the exterior diameter $d_{If}$ is produced with the interior diameter $D_{If}$ of the cam 14 with a slight dimensional overlap.

Conversely, the smaller base circle $d_{Imin}$ of the section 24 is slightly smaller by the measure b than the interior diameter $D_{IIf}$ of the cam 16. Moreover, the larger base circle $D_{IImax}$ of the cam 16 is slightly greater by the measure a than the exterior diameter $d_{If}$ of the section 24.

As a result, the second (center) cam 16 can be slid over the section 24 during assembly without applying a force, with the spline 32, 34 engaging accordingly.

The cam 16 can then be shrunk the section 26 of the shaft 12. The firm seat is attained by the dimensional overlap between $d_{IIf}$ and $D_{IIf}$.

The cam 16 is subsequently shrunk on or pressed on to the section 24, wherein the firm seat is attained by the dimensional overlap between $d_{If}$ and $d_{If}$.

The invention is not limited to the illustrated exemplary embodiment. Other assembled shaft-hub connections aside from a camshaft may be constructed in a similar fashion. The cams 16 and/or the cams 18 can also be formed by another functional part, for example an eccentric part, a worm wheel, etc.

The invention claimed is:

1. A shaft-hub connection on an assembled camshaft for an internal combustion engine, comprising:
    a shaft having a shaft diameter, a first end, and a second end;
    a first bearing section arranged on the first end, the first bearing section having a first bearing section diameter;
    a first shaft section arranged on the second end, the first shaft section having a circumferentially continuous exterior spline with a root diameter and a tip diameter, the root diameter of the first shaft section being greater than the shaft diameter;
    a second shaft section arranged between the first bearing section and the first shaft section, the second shaft section having an exterior circumference constructed as a cylinder, the second shaft section having a second shaft section diameter, the second shaft section diameter being greater than the shaft diameter, the second shaft section diameter being greater by a first predefined clearance than the root diameter of the first shaft section, the second shaft section diameter being less than the tip diameter of the first shaft section;
    a first cam connected to the first shaft section by a shrink fit or a press fit, the first cam having an interior circumference constructed as a cylinder and an interior first cam diameter, the interior first cam diameter being substantially identical to the tip diameter of the first shaft section;
    a second cam connected to the second shaft section by a shrink fit or a press fit, the second cam having a circumferentially continuous interior spline, the interior spline of the second cam being complementary to the exterior spline of the first shaft section, the interior spline of the second cam having a root diameter and a tip diameter, the tip diameter of the second cam being substantially identical to the second shaft section diameter, the root diameter of the second cam being greater by a second predefined clearance than the tip diameter of the first shaft section thereby enabling the second cam to slide over the first shaft section;
    the first bearing section diameter being greater than the tip diameter of the first shaft section and the second shaft section diameter thereby preventing each of the first cam and the second cam from sliding onto the shaft at the first end.

2. The shaft-hub connection of claim 1, wherein the second shaft section diameter is machined to size by turning or grinding, and the interior circumference of the first cam is fine-bored or reamed.

3. The shaft-hub connection of claim 1, wherein the exterior spline of the first shaft section is formed by a rolling tool, and the tip diameter of the first shaft section is ground to size.

4. The shaft-hub connection of claim 3, wherein the tip diameter of the second cam is precision drilled and the root diameter of the second cam is formed by clearing.

* * * * *